United States Patent
Maruko et al.

(10) Patent No.: US 6,290,612 B1
(45) Date of Patent: Sep. 18, 2001

(54) SOLID GOLF BALL

(75) Inventors: Takashi Maruko; Hisashi Yamagishi; Yutaka Masutani; Atsushi Nakamura, all of Chichibu (JP)

(73) Assignee: Bridgestone Sports Co., Ltd., Tokyo (JP)

(*) Notice: Subject to any disclaimer, the term of this patent is extended or adjusted under 35 U.S.C. 154(b) by 0 days.

(21) Appl. No.: 09/464,402

(22) Filed: Dec. 16, 1999

(30) Foreign Application Priority Data

Jun. 29, 1999 (JP) .................................................. 11-182885

(51) Int. Cl.$^7$ .................................................. A63B 37/12
(52) U.S. Cl. .............................................................. 473/376
(58) Field of Search ...................................... 473/376, 373, 473/374, 370, 371, 367, 368

(56) References Cited

U.S. PATENT DOCUMENTS 5,772,531 * 6/1998 Ohsumi et al. ....................... 473/376
6,045,460 * 4/2000 Hayashi et al. ...................... 473/376

FOREIGN PATENT DOCUMENTS 10-127819  5/1998  (JP) .
10-179797  7/1998  (JP) .

* cited by examiner

Primary Examiner—Mark S. Graham
Assistant Examiner—Raeann Gorden
(74) Attorney, Agent, or Firm—Sughrue, Mion, Zinn, Macpeak & Seas, PLLC

(57) ABSTRACT

A solid golf ball having a multilayer structure including a S core of one or more layers, an enclosing layer, an intermediate layer, and a cover of one or more layers. The intermediate layer is made of a cis-1,4-polybutadiene base rubber composition, and the enclosing layer is composed primarily of a resin material. The enclosing layer and the intermediate layer have a difference in hardness at the boundary therebetween within ±3 JIS-C hardness units. The ball has excellent durability and a good feel when hit with a golf club.

19 Claims, 1 Drawing Sheet

SOLID GOLF BALL

BACKGROUND OF THE INVENTION

1. Field of the Invention

The present invention relates to a multilayer golf ball having at least four layers and having excellent durability and a good "feel" when hit with a golf club.

2. Related Art

A number of approaches have been tried to enhance the feel and distance of solid golf balls composed of a solid core and a cover. One such approach has been to increase the number of layers in the ball. For example, JP-A 10-127819 discloses a golf ball wherein the solid core is formed to a three-layer construction of an inner layer, an intermediate layer, and an outer layer. The inner and outer layers are each made of rubber compositions, and the intermediate layer is composed of a thermoplastic elastomer, typically thermoplastic polyamide elastomer. These choices are made in order to provide improved distance and a soft feel.

Similarly intending to provide a good feel and improved distance, JP-A 10-179797 discloses a golf ball that has a four-layer construction comprising two inner and outer intermediate layers situated between a "center" serving as the core and a cover which corresponds to the ball's surface. The thickness and JIS-C hardness ranges are prescribed for each layer. Essentially, the inner intermediate layer made of ionomer resin is situated between the core and the outer intermediate layer made of rubber compositions as illustrated in the examples of this reference.

The above art attempts to enhance the feel and distance of a golf ball by increasing the number of layers and specifying the material and hardness for each layer.

However, in these prior-art golf balls, providing larger differences in hardness between the respective layers so as to further enhance performance tends to lead to stress concentration at the boundary surfaces between the layers, making the ball more prone to failure when hit. This problem is most acute in balls that use a rubber material in the intermediate layer to achieve relatively good resilience.

SUMMARY OF THE INVENTION

It is therefore an object of the invention to provide a multilayer golf ball composed of at least four layers which uses a rubber material in the intermediate layer to achieve good resilience and, even when the differences in hardness between the layers are increased to maximize the performance enhancing effect, exhibits excellent durability and feel.

Accordingly, the invention provides a solid golf ball comprising a core having at least one layer, an enclosing layer that encloses the core, an intermediate layer that encloses the enclosing layer, and a cover having at least one layer that encloses the intermediate layer. The intermediate layer of the ball is made of a rubber composition composed primarily of cis-1,4-polybutadiene, and the enclosing layer is composed primarily of a resin material. The enclosing layer and the intermediate layer have a difference in hardness at the boundary therebetween within ±3 JIS-C hardness units.

Typically, the enclosing layer in the golf ball is composed primarily of a polyester resin, polyurethane resin or a mixture thereof, and the core is composed primarily of a polyamide resin, ionomer resin, polyester resin, polycarbonate resin, polyarylate resin, ABS resin or a mixture thereof. Preferably the intermediate layer of the inventive ball has a JIS-C hardness of 45 to 85 on a surface thereof in contact with the enclosing layer. Moreover, the enclosing layer preferably has a thickness of 0.5 to 5.0 mm.

The present invention is based upon our discovery that when the rubber intermediate layer which is most subject to failure is provided on the inside thereof with a core-enclosing layer composed of a resin material having about the same hardness as the rubber intermediate layer and a relatively large impact strength, stress concentration arising from hardness differences can be shifted from the more failure-prone rubber intermediate layer to the impact-resistant core-enclosing layer. This enables a dramatic improvement in durability. In particular, the ball maintains an outstanding durability even when the difference in hardness between the core at the center of the ball and the intermediate layer about the core is increased to maximize the performance-enhancing effect. Moreover, the ball, when hit with a golf club, has a softer feel on impact than prior-art balls of this class, with a moderate degree of reaction (or less sting to the hands).

BRIEF DESCRIPTION OF THE DRAWING

The objects, features and advantages of the invention will become more apparent from the following detailed description.

The only figure.

DETAILED DESCRIPTION OF THE INVENTION

Figure 1:
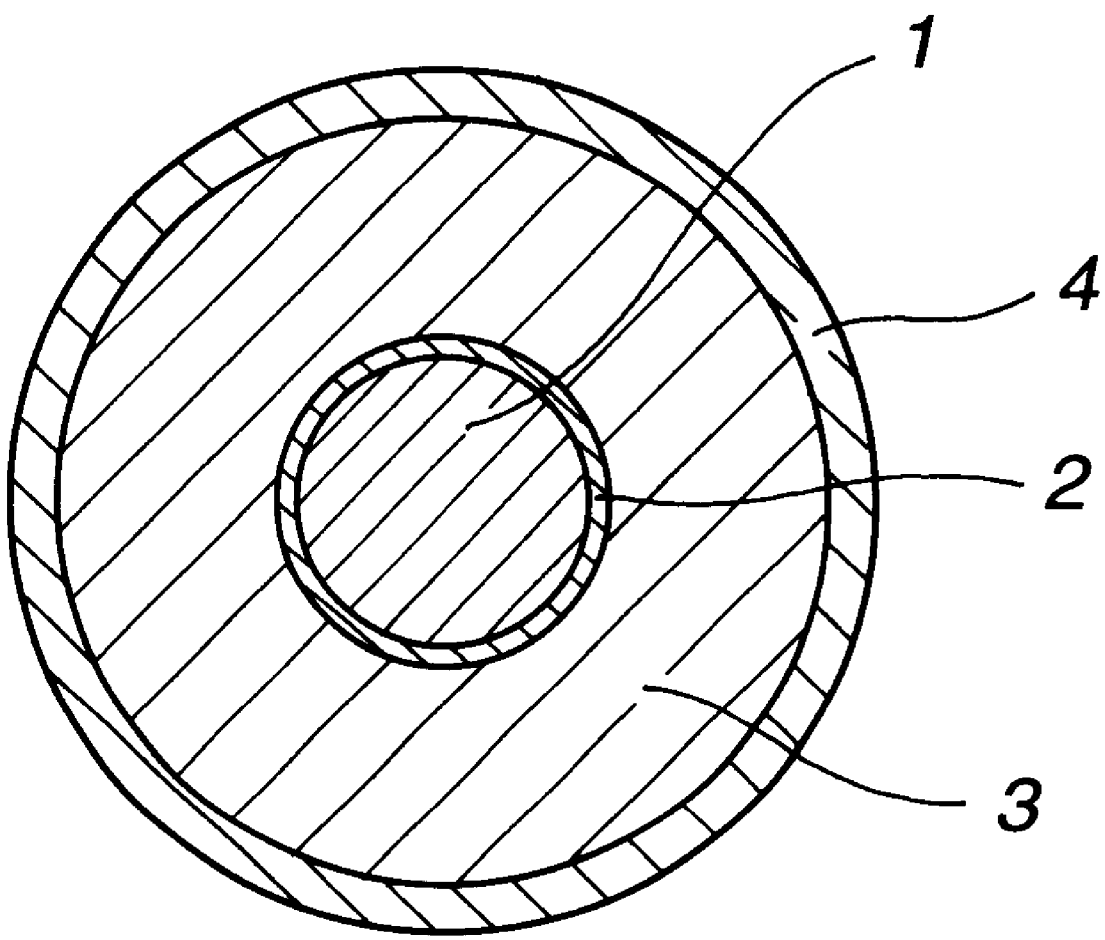
FIG. 1 is a sectional view showing a solid golf ball according to one embodiment of the invention.

Referring to FIG. 1, the solid golf ball of the invention has a four-layer construction comprising a core 1, an enclosing layer 2 enclosing the core 1, an intermediate layer 3 enclosing the enclosing layer 2, and a cover 4 enclosing the intermediate layer 3. The core 1, intermediate layer 3, and cover 4 are each shown in FIG. 1 as composed of one layer, but each may have a multilayer construction composed of two or more layers, if necessary.

The core 1 at the center of the ball may be made primarily of a thermoplastic resin. Any thermoplastic resin known to the art may be used as this material. Illustrative examples include polyamide resins, ionomer resins, polyester resins, polycarbonate resins, polyarylate resins, ABS resins and mixtures thereof. Some examples of highly suitable commercial products include Surlyn (ionomer resins manufactured by E.I. DuPont de Nemours and Co.), Himilan (ionomer resins manufactured by DuPont-Mitsui Polychemicals Co., Ltd.), Hytrel (polyester resins manufactured by DuPont-Toray Co., Ltd.), Rilsan BMNO (polyamide resins manufactured by Toray Industries, Inc.), Pebax (polyamide resins manufactured by Toray Industries, Inc.), U-Polymer (polyarylate resins manufactured by Unitika, Ltd.), and Ube Nylon (polyamide resins manufactured by Ube Industries, Ltd.).

If desired, an inorganic filler such as barium sulfate, titanium dioxide or zinc oxide may be compounded with the thermoplastic resin as a weight-modifying agent.

Production of the core 1 from the thermoplastic resin is preferably carried out by an injection molding process.

Alternatively, the core 1 may be made of a polybutadiene-based rubber composition. The use of 1,4-polybutadiene having a cis structure content of at least 40% is especially suitable. Where desired, other suitable rubber components such as natural rubber, polyisoprene rubber or styrene-butadiene rubber may be suitably compounded with the polybutadiene in an amount of up to 10 parts by weight per 100 parts by weight of the polybutadiene.

A crosslinking agent may be blended in the rubber composition. Exemplary crosslinking agents are the zinc and magnesium salts of unsaturated fatty acids (e.g., zinc methacrylate, zinc acrylate), and ester compounds (e.g., trimethylpropane methacrylate). Zinc acrylate is especially preferred for imparting high resilience. The crosslinking agent is included in an amount of preferably 10 to 40 parts by weight per 100 parts by weight of the base rubber.

A vulcanizing agent can generally be compounded in the rubber composition. Other suitable ingredients that may be added if necessary to the rubber composition include antioxidants, and fillers such as zinc oxide or barium sulfate for adjusting the specific gravity. The amount of such specific gravity modifiers typically included in the composition is from 0.5 to 70 parts by weight, and preferably from 1 to 30 parts by weight, per 100 parts by weight of the base rubber.

Production of the core 1 from such a rubber composition may be carried out by ordinary vulcanization and molding. For example, the core may be produced by vulcanization in a mold at 155° C. for a period of 20 minutes.

It is recommended that the core 1 be formed to a diameter of 12 to 35 mm, and preferably 15 to 33 mm. A too small core would fail to achieve its effect whereas a too large core would adversely affect resilience.

The core preferably has a specific gravity of 0.9 to 1.4.

No particular limitation is imposed on the surface hardness of the core, although a JIS-C hardness of at least 50, and especially at least 55, but not more than 90, is preferred.

The core-enclosing layer 2 between the core 1 and the intermediate layer 3 must be composed primarily of a resin material. Thermoplastic resins are highly suitable as the resin material. Illustrative examples include polyester resins, polyurethane resins and mixtures thereof. Some examples of suitable commercial products include Hytrel (thermoplastic polyester elastomers manufactured by DuPont-Toray Co., Ltd.) and Pandex (thermoplastic polyurethane elastomers manufactured by Dainippon Ink & Chemicals, Inc.).

The method used to form the enclosing layer 2 over the surface of the core 1 may be an injection molding method involving, for example, placing the core in a mold and injection molding the resin material into the mold cavity. Another method that may be used is to mold a pair of half-cups from a thermoplastic resin sheet, enclose the core 1 within these half-cups, then apply heat and pressure.

In the practice of the invention, the enclosing layer 2 is typically formed to a thickness or gage of from 0.5 to 5.0 mm, and preferably from 2.0 to 4.5 mm. If the enclosing layer 2 is too thin, there is a likelihood that the stress that normally concentrates on the inside surface of the overlying intermediate layer 3 (to be described later) cannot be made to concentrate instead within the enclosing layer 2. As a result, the ball cannot be conferred with a good durability and a performance-enhancing effect. On the other hand, if the enclosing layer 2 is too thick, the resin material of which this layer is made accounts for such a large proportion of the overall ball that it might not be possible for the ball to retain sufficient resilience.

The intermediate layer 3 is formed over the enclosing layer 2 and is made of a cis-1,4-polybutadiene-based rubber composition. The use of 1,4-polybutadiene having a cis structure content of at least 40%, and preferably at least 90%, is highly suitable. Where desired, other rubber components such as natural rubber, polyisoprene rubber or styrene-butadiene rubber may be compounded as appropriate. The rebound characteristics of the golf ball can be improved by increasing the proportion of rubber components. The other components may be blended in an amount of up to 10 parts by weight per 100 parts by weight of the polybutadiene.

Crosslinking agents, vulcanizing agents, antioxidants, fillers and other components in the rubber composition used to make the intermediate layer 3 may be formulated in the same proportions as in the above-described rubber composition that can be used to form the core 1. A vulcanizing agent can generally be formulated in the rubber composition used to make the intermediate layer 3. It is recommended that the vulcanizing agent include a peroxide in an amount representing at least 30% by weight, and preferably at least 40% by weight, of the overall vulcanizing agent. No particular upper limit is imposed on the amount of peroxide, although this is preferably not more than 70% by weight. Examples of suitable peroxides include commercially available products such as Perhexa 3M (manufactured by Nippon Oils and Fats Co., Ltd.). The amount of vulcanizing agent included in the rubber composition is preferably set at from 0.6 to 2 parts by weight per 100 parts by weight of the base rubber.

The intermediate layer 3 may be produced from such a rubber composition by a known vulcanization and curing process. Use is preferably made of a two-step process in which the rubber composition is first subjected to primary vulcanization (semi-vulcanization) in a mold to form a pair of hemispherical cups. The core 1 about which the enclosing layer 2 has been formed is then placed in one of the hemispherical cups, the other cup is closed over this, and secondary vulcanization (full vulcanization) is carried out.

In the practice of the invention, it is critical for the intermediate layer 3 to have a JIS-C hardness, on the surface thereof in contact with the enclosing layer 2, which differs by not more than 3 units, and preferably not more than 2 units, from the JIS-C hardness of the enclosing layer 2. This condition enables stress that arises on the inside surface of the intermediate layer 3 to be concentrated at the enclosing layer 2, thus enhancing the durability and feel of the ball. If the difference in the JIS-C hardness between the enclosing layer 2 and the intermediate layer 3 is greater than ±3 units (that is, if one of the layers has a hardness more than 3 units lower or higher than the other layer), stress concentration arises between the intermediate layer 3 and the enclosing layer 2, which makes the ball more likely to fail and less likely to have a good feel. Although the respective individual JIS-C hardnesses of the enclosing layer 2 and the intermediate layer 3 may be made substantially the same (i.e., within the hardness difference of ±3), the JIS-C hardness values for both the enclosing layer 2 and the intermediate layer 3 are preferably from 45 to 85, and especially from 50 to 80.

To maximize the ball performance-enhancing effects, it is recommended that the intermediate layer 3 be provided with a large difference in JIS-C hardness relative to the core 1. Specifically, a core to intermediate layer JIS-C hardness difference A of at least ±5, preferably at least ±8, and most preferably at least ±10, but preferably not more than ±50, and most preferably not more than ±45, is advisable.

The thickness or gage of the intermediate layer 3 may be suitably adjusted accordingly to the overall balance in the ball construction and is not subject to any particular limitation, although a thickness of 1 to 12 mm, and especially 2 to 10 mm, is generally preferred.

The intermediate layer 3 generally has a specific gravity of from 1.0 to 1.3, and preferably from 1.05 to 1.25.

The intermediate layer-enclosed core generally has a diameter of from 36 to 41.5 mm, and preferably from 37.5 to 39.5 mm.

The golf ball of the invention is formed by enclosing the intermediate layer-enclosed core with a cover 4. This may be done using a known golf ball cover stock material, suitable examples of which include ionomer resins, polyurethane-, polyamide- and polyester-based thermoplastic elastomers, and balata rubber. A conventional injection molding or other suitable technique may be used to form the cover 4.

Preferably, the cover 4 has a thickness or gage of 0.5 to 3.0 mm, and especially 0.8 to 2.5 mm. It is recommended that the cover have a Shore D hardness of 40 to 70, and preferably 50 to 65. Too low a hardness would give the ball insufficient resilience whereas excessive hardness would result in poor durability. A specific gravity of from 0.9 to 1.4 is recommended.

As already noted, the core 1, intermediate layer 3 and cover 4 of the inventive golf ball are not limited to a single layer and may each independently have a multilayer construction composed of two or more layers. If any of these portions of the ball is given a multilayer structure, the plural layers making up that portion should be adjusted to an overall thickness within the respective ranges described above.

As in conventional golf balls, the golf ball of the invention has numerous dimples formed on the surface of the cover. The total number of dimples is preferably from 350 to 500, more preferably from 370 to 480, and most preferably from 390 to 450. The dimples may be distributed in a geometrical arrangement that is octahedral or icosahedral, for example. Nor is the dimple pattern limited to a circular pattern, the use of any other suitable pattern, such as a square, hexagonal, pentagonal or triangular pattern, also being acceptable.

The inventive golf ball may be formed so as to have a diameter and weight which are in accordance with the Rules of Golf; that is, a diameter of not less than 42.67 mm, and a weight of not more than 45.93 grams.

There has been described a solid golf ball which is fully durable to impact and gives a good feel when hit.

EXAMPLES

Examples of the invention and comparative examples are given below by way of illustration, and are not intended to limit the invention.

Examples and Comparative Examples

Cores having the characteristics shown in Table 2 were produced by injection molding the resin-based compositions in Table 1, or by molding and vulcanizing the rubber compositions in Table 1.

Next, in all the examples save Comparative Example 1, an enclosing layer was formed around the core by injection molding the thermoplastic resins shown in Table 1.

An intermediate layer was formed in each example by working the rubber composition shown in Table 1 with a mixing roll, then subjecting the worked composition to primary vulcanization (semi-vulcanization) in a mold at 130° C. for 10 minutes to give a pair of hemispherical cups. The pair of hemispherical cups was closed as the intermediate layer over the core portion of the ball composed of the core and the enclosing layer or, in Comparative Example 1, directly over the surface of the core itself, then subjected to secondary vulcanization (full vulcanization) at 155° C. for 20 minutes, giving an intermediate layer-enclosed core portion composed of the core surrounded by one or two layers.

A cover was then formed in each example by injection-molding a material formulated as shown in Table 1 about the intermediate layer to give golf balls bearing dimples of the same shape, arrangement and number on the surface.

The feel and durability of the resulting golf balls were evaluated. The results are shown in Table 2.

The feel of the golf ball when hit with a club was rated as excellent (Exc), very good (VG), good or poor.

Durability was evaluated by repeatedly hitting the ball at a head speed of 45 m/s using a swing robot and determining the number of times the ball had been hit when it failed. The durability index shown in Table 2 for each example is based on an assigned value of 100 for the number of strokes required for the ball in Comparative Example 1 to fail.

TABLE 1

| Formulations (pbw) | | EX 1 | EX 2 | EX 3 | EX 4 | EX 5 | EX 6 | CE 1 | CE 2 | CE 3 |
|---|---|---|---|---|---|---|---|---|---|---|
| Core | Base material | resin | resin | resin | rubber | rubber | rubber | rubber | rubber | rubber |
| | cis-1,4-Polybutadiene[1] | | | | 100.0 | 100.0 | 100.0 | 100.0 | 100.0 | 100.0 |
| | Zinc diacrylate | | | | 25.0 | 10.0 | 20.0 | 25.0 | 10.0 | 23.0 |
| | Zinc oxide | | | | 21.9 | 65.0 | 21.3 | 19.6 | 65.0 | 30.8 |
| | Nocrack NS-5[2] | | | | 0.5 | 0.5 | 0.5 | 0.5 | 0.5 | 0.5 |
| | Dicumyl peroxide | | | | 1.0 | 1.0 | 1.0 | 1.0 | 1.2 | 2.0 |
| | Vulcanization conditions | | | | 155° C./20 min | 155° C./20 min | 155° C./20 min | 155° C./20 min | 155° C./20 min | 155° C./20 min |
| | 1018I[3] | 100 | | | | | | | | |
| | Himilan 1605[4] | | 100 | | | | | | | |
| | Hytrel 4047[5] | | | 100 | | | | | | |
| Core enclosing layer | Hytrel 4047[5] | 100 | | | 100 | | | | | |
| | Hytrel 4767[5] | | 100 | | | 100 | | | | |
| | Hytrel 5557[5] | | | 100 | | | | | | |
| | Pandex T1198[6] | | | | | | 100 | | | |
| | Pebax 2533S[7] | | | | | | | | 50 | |
| | Himilan 1605[4] | | | | | | | | 50 | 50 |
| | Himilan 1706[4] | | | | | | | | | 50 |
| Intermediate layer | cis-1,4-Polybutadiene | 100.0 | 100.0 | 100.0 | 100.0 | 100.0 | 100.0 | 100.0 | 100.0 | 100.0 |

TABLE 1-continued

| Formulations (pbw) | | EX 1 | EX 2 | EX 3 | EX 4 | EX 5 | EX 6 | CE 1 | CE 2 | CE 3 |
|---|---|---|---|---|---|---|---|---|---|---|
| | Zinc diacrylate | 22.0 | 26.0 | 33.0 | 15.0 | 26.0 | 33.0 | 15.0 | 28.0 | 15.0 |
| | Zinc oxide | 23.3 | 28.4 | 19.5 | 23.3 | 8.5 | 15.4 | 23.3 | 5.0 | 32.5 |
| | Nocrack NS-6[2] | 0.2 | 0.2 | 0.2 | 0.5 | 0.2 | 0.2 | 0.5 | 0.5 | 0.5 |
| | Dicumyl peroxide | 1.0 | 1.0 | 1.0 | 1.0 | 1.0 | 1.0 | 1.0 | 1.5 | 2.0 |
| | Primary vulcanization conditions | 130° C./ 10 min | 130° C./ 10 min | 130° C./ 10 min | 130° C./ 10 min | 130° C./ 10 min | 130° C./ 10 min | 130° C./ 10 min | 130° C./ 10 min | 130° C./ 10 min |
| | Secondary vulcanization conditions | 155° C./ 20 min | 155° C./ 20 min | 155° C./ 20 min | 155° C./ 20 min | 155° C./ 20 min | 155° C./ 20 min | 155° C./ 20 min | 155° C./ 20 min | 155° C./ 20 min |
| Cover | Himilan 1605[4] | 50 | 50 | 50 | | | 50 | | 50 | 50 |
| | Himilan 1706[4] | 50 | 50 | 50 | 50 | 50 | 50 | 50 | 50 | 50 |
| | Surlyn 8120[8] | | | | 50 | 50 | | 50 | | |

[1] 90/10 mixture of BR19 and BR11, available from Japan Synthetic Rubber Co., Ltd.
[2] Nocrack NS-5 and NS-6, antioxidants available from Ouchi Shinko Kagaku K.K.
[3] Ube Nylon 1018I, a polyamide resin available from Ube Industries, Ltd.
[4] Himilan 1605 and 1706, ionomer resins available from DuPont-Mitsui Polychemicals Co., Ltd.
[5] Hytrel 4047, 4767 and 5557, polyester elastomers available from DuPont-Toray Co., Ltd.
[6] Pandex T1198, a polyurethane elastomer available from to Toray Industries, Inc.
[7] Pebax 2533S, a polyamide elastomer available from Toray Industries, Inc.
[8] Surlyn 8120, an ionomer resin available from E. I. DuPont de Nemours and Co.

TABLE 2

| | | EX 1 | EX 2 | EX 3 | EX 4 | EX 5 | EX 6 | CE 1 | CE 2 | CE 3 |
|---|---|---|---|---|---|---|---|---|---|---|
| Core | Diameter (mm) | 15.0 | 20.0 | 23.0 | 33.0 | 25.0 | 20.0 | 35.0 | 25.0 | 25.0 |
| | Weight (g) | 1.9 | 4.1 | 7.1 | 21.9 | 11.3 | 4.8 | 25.7 | 11.3 | 9.8 |
| | JIS-C hardness | 100 | 91 | 64 | 76 | 55 | 66 | 76 | 55 | 73 |
| Enclosing layer | Thickness (mm) | 2.0 | 2.0 | 3.0 | 1.0 | 1.5 | 4.5 | | 1.5 | 1.5 |
| | JIS-C hardness | 63 | 71 | 80 | 63 | 71 | 78 | | 73 | 93 |
| Enclosed core (core + enclosing layer) | Diameter (mm) | 19.0 | 24.0 | 29.0 | 35.0 | 28.0 | 29.0 | | 28.0 | 28.0 |
| | Weight (g) | 3.9 | 7.6 | 14.8 | 25.9 | 15.1 | 15.2 | | 14.5 | 13.0 |
| Intermediate layer | Thickness (mm) | 10.0 | 7.35 | 5.0 | 2.0 | 5.15 | 5.0 | 2.0 | 5.15 | 5.05 |
| | JIS-C hardness | 63 | 72 | 80 | 61 | 71 | 80 | 61 | 77 | 65 |
| Intermediate layer-enclosed core (core + enclosing layer + intermediate layer) | Diameter (mm) | 39.0 | 38.7 | 39.0 | 39.0 | 38.3 | 39.0 | 39.0 | 38.3 | 38.1 |
| | Weight (g) | 35.9 | 35.4 | 36.1 | 35.8 | 34.5 | 36.1 | 35.6 | 34.2 | 34.0 |
| Cover | Shore D hardness | 64 | 64 | 64 | 54 | 54 | 64 | 54 | 64 | 64 |
| Ball | Shape Diameter (mm) | 42.7 | 42.7 | 42.7 | 42.7 | 42.7 | 42.7 | 42.7 | 42.7 | 42.7 |
| | Weight (g) | 45.3 | 45.5 | 45.5 | 45.2 | 45.5 | 45.5 | 45.0 | 45.2 | 45.4 |
| | Tests Feel | Exc | Exc | VG | Exc | VG | Exc | Poor | Good | Poor |
| | Durability index | 134 | 131 | 141 | 121 | 127 | 153 | 100 | 109 | 76 |

As is evident from Table 2, the golf balls according to the present invention all had a pleasant feel and excellent durability to repeated impact.

By contrast, the golf ball in Comparative Example 1, which lacked an enclosing layer, had an inadequate feel and a poor durability. The golf ball in Comparative Example 2, which had a hardness difference between the enclosing layer and the intermediate layer that was only one JIS-C hardness unit outside of the range specified in the invention, had an ordinary, though entirely unimproved, feel and a poor durability. The golf ball in Comparative Example 3 having a too large hardness difference between the enclosing layer and the intermediate layer compromised the inherent durability of the ball and failed to provide a sufficiently good feel, despite the existence of the enclosing layer.

Japanese Patent Application No. 11-182885 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A solid golf ball having a multilayer structure comprising a core having at least one layer, an enclosing layer that encloses the core, an intermediate layer that encloses the enclosing layer, and a cover having at least one layer that encloses the intermediate layer, wherein the intermediate layer is made of a rubber composition composed primarily of cis-1,4-polybutadiene, the enclosing layer is composed primarily of a resin material, and the enclosing layer and the intermediate layer have a difference in hardness at a boundary therebetween within ±3 JIS-C hardness units, wherein the core has a specific gravity of 0.9 to 1.4.

2. The golf ball of claim 1 wherein the enclosing layer is composed primarily of a resin selected from the group consisting of polyester resins, polyurethane resins and mixtures thereof.

3. The golf ball of claim 1 wherein the intermediate layer has a JIS-C hardness of 45 to 85 at a surface thereof in contact with the enclosing layer.

4. The golf ball of claim 1 wherein the enclosing layer has a thickness of 0.5 to 5.0 mm.

5. The golf ball of claim 1 wherein the core is composed primarily of a resin selected from the group consisting of polyamide resins, ionomer resins, polyester resins, polycarbonate resins, polyarylate resins, ABS resins and mixtures thereof.

6. The golf ball of claim 1, wherein the core is formed to a diameter of 12 to 35 mm.

7. The golf ball of claim 1, wherein the core is formed to a diameter of 15 to 35 mm.

8. The golf ball of claim 1, wherein the core has a JIS-C hardness of 55 to 90 at a surface thereof.

9. The golf ball of claim 1, wherein the enclosing layer has a thickness of 2.0 to 4.5 mm.

10. The golf ball of claim 1, wherein the JIS-C hardness values for both the enclosing layer and the intermediate layer is 45 to 85.

11. The golf ball of claim 1, wherein the JIS-C hardness values for both the enclosing layer and the intermediate layer is 50 to 80.

12. The golf ball of claim 1, wherein the core to the intermediate layer JIS-C hardness difference is at least ±5.

13. The golf ball of claim 1, wherein the core to the intermediate layer JIS-C hardness difference is at least ±8.

14. The golf ball of claim 1, wherein the core to the intermediate layer JIS-C hardness difference is at least ±10.

15. The golf ball of claim 1, wherein the intermediate layer enclosed core has a diameter of 36 to 41.5 mm.

16. The golf ball of claim 1, wherein the intermediate layer enclosed core has a diameter of 37.5 to 39.5 mm.

17. The golf ball of claim 1, wherein the cover has a thickness of 0.5 to 3.0 mm.

18. The golf ball of claim 1, wherein the cover has a thickness of 0.8 to 2.5 mm.

19. A solid golf ball having a multilayer structure comprising a core having at least one layer, an enclosing layer that encloses the core, an intermediate layer that encloses the enclosing layer, and a cover having at least one layer that encloses the intermediate layer, wherein the intermediate layer is made of a rubber composition composed primarily of cis-1,4-polybutadiene, the enclosing layer is composed primarily of a resin material, and the enclosing layer and the intermediate layer have a difference in hardness at a boundary therebetween within ±3 JIS-C hardness units;

wherein the core is composed primarily of a resin selected from the group consisting of polyamide resins, ionomer resins, polyester resins, polycabonate resins, ABS resins and mixtures thereof.

* * * * *